United States Patent
Mukaino

[11] Patent Number: 6,144,730
[45] Date of Patent: Nov. 7, 2000

[54] METHOD OF OPTIMUM CALL DISTRIBUTION USING AN INTELLIGENT NETWORK AND SYSTEM THEREOF

[75] Inventor: Masahiro Mukaino, Tokyo, Japan

[73] Assignee: NEC Corporation, Tokyo, Japan

[21] Appl. No.: 09/023,791

[22] Filed: Feb. 13, 1998

[30] Foreign Application Priority Data

Feb. 13, 1997 [JP] Japan ................................. 9-044731

[51] Int. Cl.[7] .................................................. H04M 7/00
[52] U.S. Cl. .......................................... 379/220; 221/230
[58] Field of Search ................................. 379/221, 229, 379/230, 220, 219, 222, 224, 137, 138

[56] References Cited

U.S. PATENT DOCUMENTS

| | | | |
|---|---|---|---|
| 4,737,983 | 4/1988 | Frauenthal et al. | 379/113 X |
| 5,048,013 | 9/1991 | Eng et al. | 379/221 X |
| 5,068,892 | 11/1991 | Livanos | 379/221 |
| 5,295,183 | 3/1994 | Langlois et al. | 379/221 X |
| 5,930,348 | 7/1999 | Regnier et al. | 379/221 |
| 5,953,403 | 9/1999 | Lefort et al. | 379/221 X |

FOREIGN PATENT DOCUMENTS

| | | |
|---|---|---|
| 4-126434 | 4/1992 | Japan . |
| 7-58853 | 3/1995 | Japan . |
| 10-13532 | 1/1998 | Japan . |

*Primary Examiner*—Creighton Smith
*Attorney, Agent, or Firm*—Sughrue, Mion, Zinn, Macpeak & Seas, PLLC

[57] ABSTRACT

A method of call distribution for selecting an optimum terminating address networkwide over the whole circuits connected to the network is provided. A computer SCP comprising means for communicating with an exchange SSP and having a function of routing a call receives and stores conditions of circuit groups under management of the exchange SSP transmitted from the exchange SSP. With respect to a call or a requirement for service from the exchange SSP, an optimum terminating address is decided networkwide according to information in a circuit group condition storing part.

3 Claims, 4 Drawing Sheets

FIG. 2

| CIRCUIT GROUP 411 | 3 |
|---|---|
| CIRCUIT GROUP 412 | 2 |
| CIRCUIT GROUP 511 | 1 |
| CIRCUIT GROUP 512 | 4 |
| CIRCUIT GROUP N | 3 |

FIG. 3

| CIRCUIT GROUP 411 | 3 |
|---|---|
| CIRCUIT GROUP 412 | 2 |

FIG. 4

| CIRCUIT GROUP 511 | 1 |
|---|---|
| CIRCUIT GROUP 512 | 4 |

METHOD OF OPTIMUM CALL DISTRIBUTION USING AN INTELLIGENT NETWORK AND SYSTEM THEREOF

BACKGROUND OF THE INVENTION

1. Field of the Invention

The present invention relates to a method and a system of optimum call distribution, and particularly, to a method and a system of optimum call distribution in an intelligent network which comprises a plurality of telephone switching nodes, referred as service switching points (SSPs), for carrying out call switching/connection operation and at least one computer node, referred as service control point (SCP), for performing routing control with communicating with the SSPs to decide optimum destination for a requested call.

2. Description of the Related Art

A conventional automatic call distribution system is disclosed in several Japanese Patent Applications. For example, Japanese Patent Application Laid-open No. Hei 2-309791 "Automatic call distribution system", Laid-open No. Hei 7-283876 "Automatic terminating call distribution system using an ISDN" and Laid-open No. Hei 8-56258 "Telephone call establishing method in an intelligent network", are some of them.

Japanese Patent Application Laid-open No. Hei 2-309791 proposes a simple automatic call distribution system which is applicable to a private branch telephone exchange with low cost. That is, an external apparatus is provided to monitor busy/idle state of each extension telephone and controls optimum call termination of calls from the central telephone office to extension telephone appropriately.

Japanese Patent Application Laid-open No. Hei 7-283876 proposes an automatic terminating call distribution system using special functions of the ISDN such as the user-user information transfer function and the call transfer function between a private branch telephone exchange and ISDN terminals. That is, a call to be terminated to the private branch telephone exchange is distributed to one of ISDN terminals using the call transfer function, and various kinds of information can be transmitted by the user-user information transfer function.

Japanese Patent Application Laid-open No. Hei 8-56258 proposes a system in which a telephone call in an intelligent network is processed and established by an intelligent terminal in cooperation with structural components of the intelligent network such as a database including information with regard to calls.

As described in the above, in a conventional call distribution system, a telephone switching system itself or a special terminal monitors a busy/idle state of a circuit or a circuit group for call destination, or routing is controlled by an intelligent terminal connected to a telephone switching system, or special functions of the ISDN is used for distributing a call. Therefore, optimum selection of a terminating address networkwide, that is, over all circuits or all circuit groups connected to a network is not possible.

SUMMARY OF THE INVENTION

The present invention is made in view of the problem mentioned in the above, and an object of the present invention is to provide a method and a system of optimum call distribution which realizes a call distribution function of deciding, with respect to a call or a demand for service originated from a plurality of telephone switching nodes (SSPs), an optimum terminating address according to the busy/idle state of circuits in the whole network.

In order to attain the object, a method and a system of optimum call distribution according to the present invention comprises plurality of exchanges and at least one processing unit having means for communicating with each exchange and a function of routing a call, and method of optimum call distribution comprising the steps of: a) exchange transmits congestion state of circuit groups accommodated in exchange to processing unit; and b) processing unit decides a circuit group as an optimum terminating circuit group, when a call for distribution is requested, based on circuit group congestion state received from each of exchanges.

Further, a method of optimum call distribution according to the present invention is characterized in that the processing unit further comprises a circuit group state storing part for receiving circuit group congestion state from exchange and storing them, and wherein the step b) further comprising the steps of: c) processing unit stores circuit group congestion state in circuit group state storing part, when processing unit receives circuit group state from exchange; and d) said processing unit decides a circuit group as an optimum terminating circuit group for a call or a service requested by exchange, with referring to information stored at circuit group state storing part.

Still further, a system of optimum call distribution according to the present invention uses an intelligent network comprising an exchange and a service control unit having means for communicating with exchange and having a function of routing calls, exchange transmitting circuit group congestion state to service control unit and service control unit comprising: means for receiving circuit group congestion state received from exchange; a circuit group state storing part for storing and managing received circuit group congestion state; means for deciding a terminating circuit group for, with respect to a call or a request for service from exchange, referring to information stored at circuit group state storing part to decide an optimum terminating address; and means for controlling routing of a call, wherein, based on circuit group congestion state, a circuit group as an optimum terminating address is decided to carry out optimum call distribution.

BRIEF DESCRIPTION OF THE DRAWINGS

FIG. 2 illustrates an example of the content of a control table of a circuit group state storing part indicating congestion state of each circuit group in the whole network in an embodiment of the present invention.

FIG. 3 illustrates an example of the content of a control table of an SSP indicating congestion state of each circuit group in the SSP in the embodiment of the present invention.

FIG. 4 illustrates an example of the content of a control table of another SSP indicating congestion state of each circuit group in the SSP in the embodiment of the present invention.

DETAILED DESCRIPTION OF THE PREFERRED EMBODIMENTS

Figure 1:
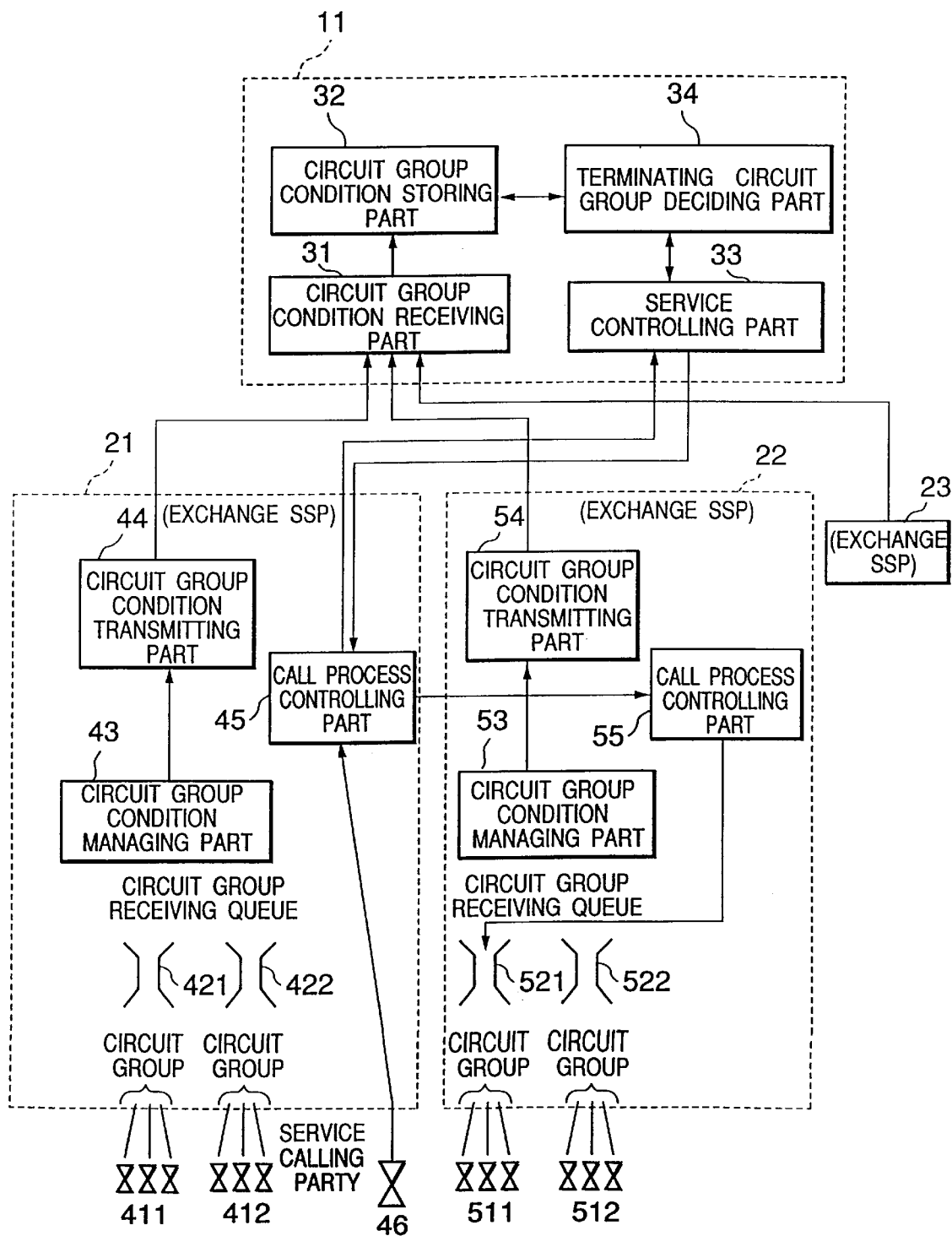
FIG. 1 illustrates the structure of an embodiment of the present invention.

An embodiment of the present invention will be described with reference to the drawings. FIG. 1 is a block diagram illustrating the structure of the embodiment of the present invention.

With reference to FIG. 1, the embodiment of the present invention comprises a plurality of SSPs 21, 22, and 23, as telephone switching nodes of a network circuit groups 411, 412, 511 and 512 as a circuit group for call distribution which are connected to the SSPs 21 and 22, respectively, and an SCP 11 as a computer node of the network.

The SSP 21 comprises terminating call queues 421 and 422 for the circuit groups 411 and 412 respectively, a circuit group state management part 43 for managing busy/idle state or congestion state of each circuit group of the SSP 21, a circuit group state transmitting part 44 for transmitting the busy/idle state or a congestion state of each circuit group of the SSP 21 to the SCP 11 whenever it has changed or periodically, and a call process controlling part 45. Similarly, the SSP 22 comprises terminating call queues 521 and 522 for the circuit groups 511 and 512 respectively, a circuit group state management part 53 for managing busy/idle state or congestion state of each circuit group of the SSP 22, a circuit group state transmitting part 54 for transmitting the busy/idle state or congestion state of each circuit group of the SSP 22 to the computer SCP 11, and an existing call process controlling part 55.

The SCP 11 has a circuit group state receiving part 31 for receiving busy/idle state or congestion state of each circuit group transmitted from each SSP, a circuit group state storing part 32 for storing busy/idle state or congestion state of each circuit group received by the circuit group state receiving part 31 as a control table indicating busy/idle state or congestion state of each circuit group, a terminating circuit group deciding part 34 for deciding an optimum routing address for a requested service, originated by a service calling party 46 and transferred through an SSP, with referring to the circuit group state storing part 32, and a function of routing a call carried out by a service controlling part 33 for deciding other existing types of routing.

The circuit group state transmitting parts 44 and 54 of the SSPs 21 and 22 transmit to the SCP 11 periodically or as occasion demands busy/idle state or congestion state of each circuit group stored in the circuit group state management parts 43 and 53, respectively. The circuit group state receiving part 31 of the SCP 11 receives the transmitted state of each circuit group, and the circuit group state storing part 32 stores the received information in the control table.

Figure 5:
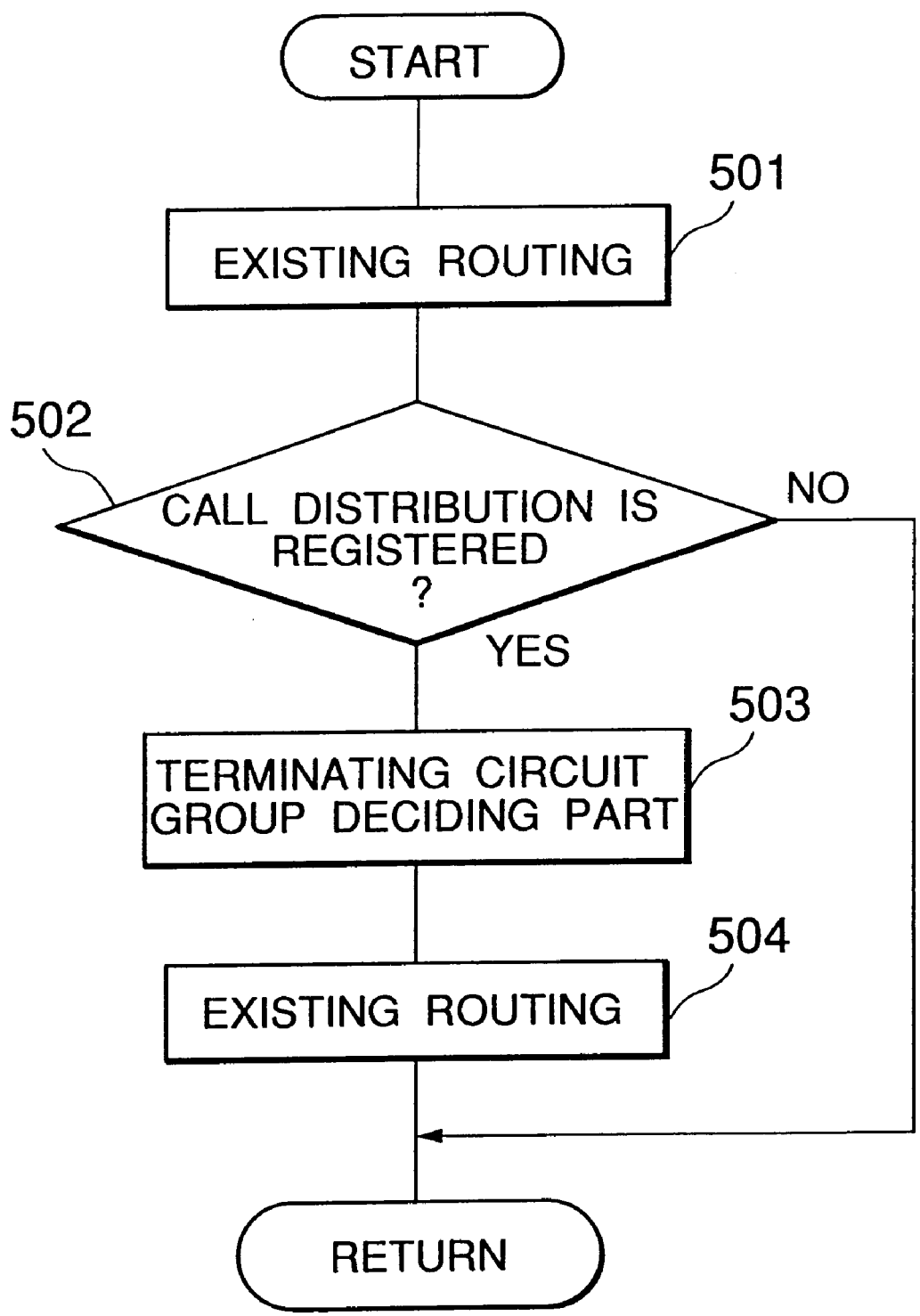
FIG. 5 is a flow chart illustrating an example of a process flow of a service controlling part 33 in the embodiment of the present invention.

When a service request is originated by a subscriber under management of the SSPs and received by the service control part 33 of the SCP 11, and if the service request is related to a call distribution (see a branch "Yes" from step 502), as illustrated in the flow chart of FIG. 5, the service controlling part 33 of the SCP 11 refers to the terminating circuit group deciding part 34 shown in FIG. 1 (step 503).

Figure 6:
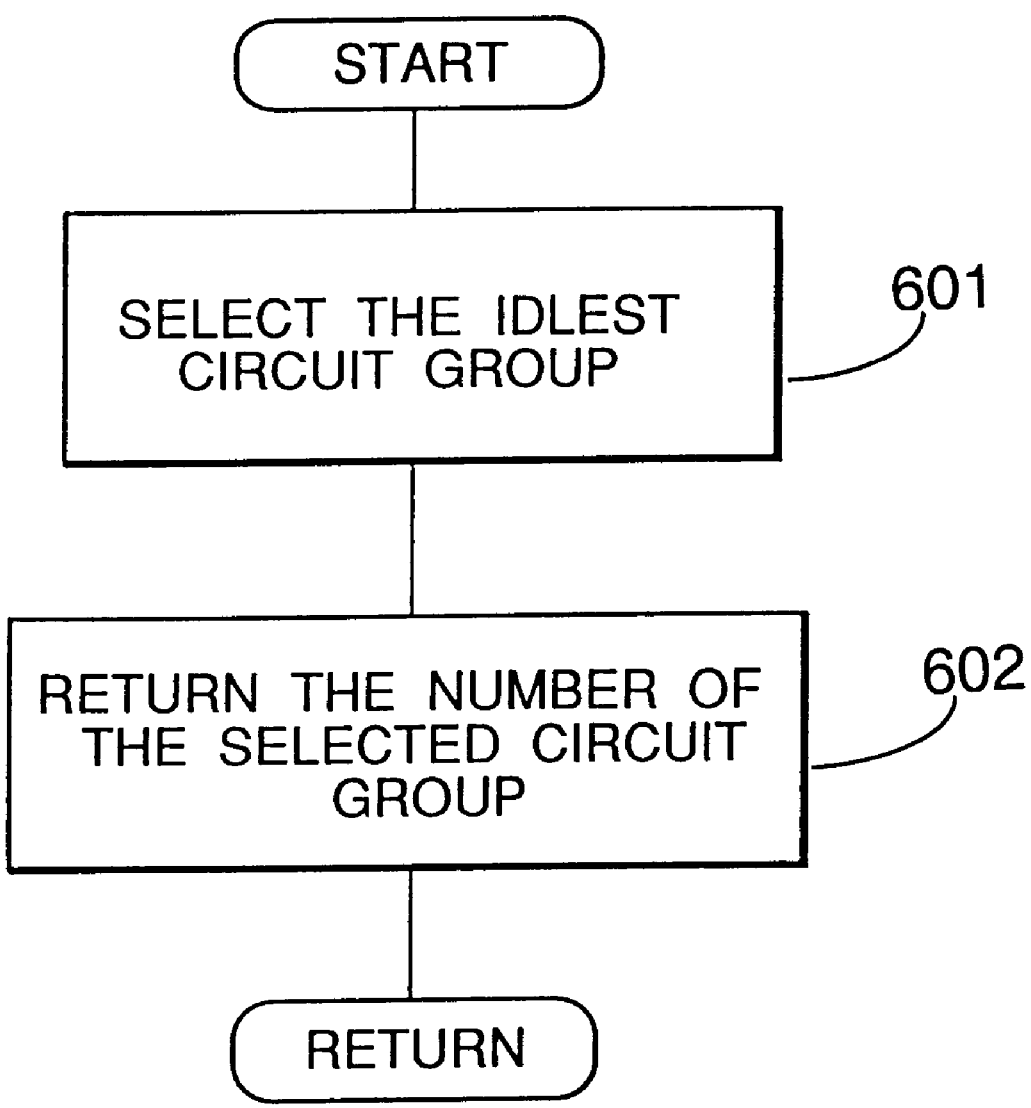
FIG. 6 is a flow chart illustrating an example of a process flow of a terminating circuit group deciding part 34 in the embodiment of the present invention.

As illustrated in the flow chart of FIG. 6, the terminating circuit group deciding part 34 refers to the circuit group state storing part 32, selects an optimum circuit group, e.g. an idle ratio of circuit is the highest or congestion state is the lightest, (step 601), and returns the number of the selected circuit group to the service controlling part 33 (step 602).

With reference to FIG. 5 again, the service controlling part 33 carries out further necessary routing as occasion demands (step 504), selects the final terminating circuit group, and returns the information to the call process controlling part of the SSP which has made the demand.

The call process controlling part (45 or 55 in FIG. 1) of the SSP carries out necessary routing and call connection with regard to the returned terminating number in the same way with regard to an ordinary call. In this way, the call is put into the terminating call queue of the target circuit group, and the call terminates one of circuit of the circuit group.

In order to describe the embodiment of the present invention in more detail, an embodiment illustrating a specific example is described in the following. It is to be noted that the basic structure of the embodiment of the present invention is similar to that shown in FIG. 1.

With reference to FIG. 1, the present embodiment comprises operator circuit groups 411, 412, 511, and 512 connected to the exchange SSPs 21 and 22 for offering telephone directory information service, the terminating call queues 421, 422, 521, and 522 which correspond the operator circuit groups 411, 412, 511, and 512, respectively, and the circuit group state management parts 43 and 53 for managing, in the respective SSPs, state (busy/idle state or congestion state) of the operator circuit groups 411, 412,511 and 512, respectively.

In the SSP 21, the state of the circuit groups are stored in the control table in the form shown in FIG. 3, and in the SSP 22, the state of the circuit groups are stored in the control table in the form shown in FIG. 4. With reference to FIGS. 3 and 4, index can be anything indicating state of circuit group, i.e. an idle number of circuit ratio, a busy number of circuit ratio or congestion state of the circuit group (in the figures, congestion state is indicated by numeric values, and the larger the value is, the busier the state is).

The circuit group state transmitting parts 44 and 54 of the SSPs 21 and 22, respectively, transmit the state of each terminating call queue for each circuit group to the SCP 11 periodically.

The circuit group state receiving part 31 of the SCP 11 receives a message from the SSP, and the circuit group state storing part 32 stores the information in the control table in the form shown in FIG. 2. With reference to FIG. 2, index of state of each circuit group with respect to all circuit groups in the network are stored in the same manner as control tables shown in FIG. 3 and FIG. 4 in the circuit group state storing part 32 (in the figure, congestion state is indicated by numeric values, and the larger the value is, the busier the state is). In this way, the state of each operator circuit group is stored in the circuit group state storing part 32 networkwide with respect to the SSPs.

With reference to FIG. 1, when a subscriber 46 originates a call of the telephone directory information service, an existing function of call routing in the SSP requests the SCP 11 to decide the terminating address of the call. The service controlling part 33 of the SCP 11 requests the optimum selection of the terminating address to the terminating circuit group deciding part 34. The terminating circuit group deciding part 34 selects the optimum circuit group, that is, the operator circuit group 511 for which the numeric value of index is "1" in the control table indicating the congestion state of the operator circuit groups (see FIG. 2) stored in the circuit group state storing part 32. The terminating circuit group deciding part 34 returns the operator circuit group number 511 to the service controlling part 33.

The service controlling part 33 receives the terminating circuit group number 511 and returns it to the SSP 21.

The call process controlling part 45 of the SSP 21 operates according to the normal call process. In this case, since the selected circuit group number (the circuit group 511) belongs to the SSP 22, the call is routed to that SSP, and eventually, connected to the operator circuit group 511.

As the result of routing to the operator circuit group 511, the state of the circuit group 511 has been changed (i.e. one circuit has become busy state). Upon occurrence of the change of state or in the next period, the change of state is transferred and stored in the circuit group state storing part 32 of the SCP 11, that is, the content of the control table indicating congestion state of the operator circuit groups shown in FIG. 2 is updated.

As described in the above, the present invention has a remarkable effect that a function of routing for deciding an optimum terminating address according to state of circuits and circuit groups can be realized networkwide with respect to SSPs.

This is because, according to the present invention, a SCP receives and stores congestion state of circuit groups from all SSPs, and, by controlling routing according to the stored state of circuits, optimum call distribution is performed networkwide over all the SSPs.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A method of call distribution using an intelligent network comprising a plurality of exchanges and at least one processing unit having means for communicating with each exchange and a function of routing a call, said method comprising:

transmitting a congestion state of each circuit group accommodated in each of the exchanges;

storing the congestion state of each circuit group belonging to a same distribution group in a control table provided in the processing unit;

selecting an optimum circuit group indicating a lowest congestion state among circuit groups in the same distribution group when the processing unit has received a routing request for call distribution from one of the exchanges; and routing and terminating a call to one of a plurality of lines in the circuit group selected by the processing unit.

2. A call distribution system using an intelligent network comprising a plurality of exchanges and at least one service control unit having means for communicating with each exchange and a function of routing a call, said call distribution system comprising:

a circuit group condition transmitting part, which transmits a congestion state of each circuit group accommodated in one of the exchanges to the service control unit; and the service control unit comprising:

means for receiving said circuit group congestion state received from said one of the exchanges;

a circuit group state storing part for storing and managing said received circuit group congestion state;

means for deciding a terminating circuit group for, with respect to a call or a request for service from said one of the exchanges, referring to information stored at said circuit group state storing part to decide an optimum terminating address; and means for controlling routing of a call, wherein, based on said circuit group congestion state, a circuit group as an optimum terminating address is decided to carry out optimum call distribution.

3. A call distribution system using an intelligent network comprising a plurality of exchanges and at least one service control unit having means for communicating with each exchange and a function of routing a call, said call distribution system comprising:

a circuit group condition transmitting part, which transmits a congestion state of each circuit group accommodated in one of the exchanges to the service control unit;

a circuit group condition receiving part, in the service control unit, which receives the congestion state of each circuit group in each exchange in the network;

a circuit group condition storing part, in the service control unit, which stores the congestion state of each circuit group belonging to a same distribution group in a control table provided in the service control unit;

a terminating circuit group deciding part, in the service control unit, which selects an optimum circuit group, as indicated by a lowest congestion state in the control table, from among circuit groups in the same distribution group when a routing request for call distribution is received from one of the exchanges; and a call process control part, in the exchanges, which inquires with the service control unit as to routing for call distribution, and terminates a call to one of a plurality of lines in the circuit group selected by the terminating circuit group deciding part.

* * * * *